(12) United States Patent
Katsuma et al.

(10) Patent No.: US 8,023,186 B2
(45) Date of Patent: Sep. 20, 2011

(54) SCREEN

(75) Inventors: Ryoji Katsuma, Matsumoto (JP); Akira Shinbo, Shiojiri (JP); Toshiaki Hashizume, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 64 days.

(21) Appl. No.: 12/627,738

(22) Filed: Nov. 30, 2009

(65) Prior Publication Data

US 2010/0157424 A1   Jun. 24, 2010

(30) Foreign Application Priority Data

Dec. 24, 2008  (JP) ................. 2008-327226

(51) Int. Cl.
*G03B 21/60* (2006.01)
(52) U.S. Cl. ..................................... 359/459
(58) Field of Classification Search .............. 359/449, 359/459, 454–455
See application file for complete search history.

(56) References Cited

U.S. PATENT DOCUMENTS

| 5,119,235 | A  | * | 6/1992  | Umeda et al. | 359/619 |
| 6,700,702 | B2 | * | 3/2004  | Sales | 359/443 |
| 7,542,205 | B2 | * | 6/2009  | Poulsen | 359/452 |
| 7,864,420 | B2 | * | 1/2011  | Shinbo et al. | 359/459 |
| 7,911,694 | B1 | * | 3/2011  | Katsuma et al. | 359/459 |
| 2006/0198020 | A1 | * | 9/2006  | Hannington | 359/453 |
| 2009/0231696 | A1 | * | 9/2009  | Shinbo et al. | 359/459 |
| 2010/0259818 | A1 | * | 10/2010 | Mikoshiba | 359/459 |

FOREIGN PATENT DOCUMENTS

JP     A-2006-215162     8/2006

* cited by examiner

*Primary Examiner* — Christopher Mahoney
(74) *Attorney, Agent, or Firm* — Oliff & Berridge, PLC

(57) ABSTRACT

A screen that reflects light from a projection apparatus to present a projected image includes: a screen substrate; and a plurality of spherical microlenses disposed on the front side of the screen substrate, wherein the microlenses are arranged along a predetermined first direction on the screen substrate to form lens rows, and adjacent microlenses in each of the lens rows have different radii of curvature.

16 Claims, 7 Drawing Sheets

SCREEN

BACKGROUND

1. Technical Field

The present invention relates a screen that reflects light from a projector or any other projection apparatus disposed in front of the screen to present a projected image.

2. Related Art

There is a reflective screen known to reflect a projected image produced by upward oblique projection to allow a viewer to observe the projected image. For example, JP-A-2006-215162 describes a screen of this type in which a large number of microlenses having the same convex shape (unit shape portions) are regularly disposed on a screen substrate to form reflection surfaces only on lower portions of the microlenses so that external light from the above is blocked and high contrast is achieved.

As another known example of the screen of this type, there is a screen having a similar function in which a large number of microlenses having the same concave shape are regularly disposed on a screen substrate.

A screen in which a large number of microlenses having the same shape are regularly disposed as described above, however, has the following problems to be solved.

In a microlens-based screen of related art, the spacing between the lenses is reduced to provide brightness equivalent to that of a matted screen, which is called a white mat. However, when the spacing between the lenses is reduced to, for example, a value smaller than 0.2 mm, glaring interference fringes, which appear above the screen and are called scintillation (or speckle), are disadvantageously produced.

On the other hand, to eliminate the scintillation, it is effective to increase the spacing between the lenses. For example, when the spacing between the lenses is increased to 0.2 mm or greater, the scintillation is hardly visible to the eyes of the viewer, and hence the viewer unlikely visually recognizes the scintillation. However, the scintillation and the brightness are in a trade-off relationship; when the spacing between the lenses is increased to 0.2 mm or greater to eliminate the scintillation, a projected image will not be sufficiently bright and the screen becomes dim.

It is alternatively conceivable to increase the diameter of each of the microlenses and hence the spacing between the lenses. In this case, however, since the number of microlenses that can be incorporated in a unit area is less than the number required, the resolution decreases and a moire pattern appears. The approach described above has therefore a limitation, and the diameter of each of the lenses is at present forced to be, for example, 0.5 mm or smaller.

SUMMARY

An advantage of some aspects of the invention is to provide an excellent screen that provides sufficient brightness, does not lower the resolution or produce a moire pattern, and reduces the degree of scintillation produced.

An aspect of the invention is directed to a screen that reflects light from a projection apparatus to present a projected image, and includes a screen substrate and a plurality of spherical microlenses disposed on the front side of the screen substrate. The microlenses are arranged along a predetermined first direction on the screen substrate to form lens rows, and adjacent microlenses in each of the lens rows have different radii of curvature.

Scintillation is conceivably caused partly by light interference, that is, when a light wave interferes with another. Specifically, light rays reflected off adjacent microlenses having the same shape, travel optical paths of the same length, and hence are in phase. In this case, the light rays interfere with each other to produce scintillation.

According to the screen described above, adjacent microlenses in the lens row have different radii of curvature. In this case, the light rays reflected off the adjacent microlenses travel optical paths of different lengths and hence are out of phase. Therefore, the light rays will less likely interfere with each other, and the degree of scintillation produced is reduced.

Since the degree of scintillation produced is reduced, it is possible to reduce the spacings between the lenses, and the reduction in the spacing increases the brightness to a satisfactory level. Further, the diameter of each of the lenses can be, for example, 0.5 mm or smaller, which prevents the resolution from decreasing and a moire pattern from being produced.

Another aspect of the invention is directed to the screen in which a plurality of concave microlenses, each of which is designed to have a hemispheric surface, are disposed on the front side of a screen substrate. The microlenses may be arranged along a first direction on the screen substrate. The first direction is determined in accordance with the direction of a principal ray, which will be described later. The thus arranged microlenses form a lens row, and adjacent microlenses in the lens row have different radii of curvature.

Still another aspect of the invention is directed to the screen in which a plurality of convex microlenses, each of which is designed to have a hemispheric surface, are disposed on the front side of a screen substrate. The microlenses may be arranged along a first direction on the screen substrate. The first direction is determined in accordance with the direction of a principal ray, which will be described later. The thus arranged microlenses form a lens row, and adjacent microlenses in the lens row have different radii of curvature.

The surface designed to have a hemispheric shape used herein means that a microlens that does not apparently have a fully hemispheric surface, for example, because it overlaps with an adjacent microlens but has a surface that is originally designed to have a hemispheric shape is included in the microlenses according to the aspects of the invention.

The principal ray used herein is defined based on a light flux incident on an area of interest on the screen, typically, a light flux incident on a central area on the screen, or based on a light flux incident on a desired area or the entire area of the screen.

In the screen described above, the centers of the radii of curvature of the microlenses that form each of the lens rows are preferably designed to be located in a single plane.

The above configuration allows the optical path lengths of the light rays reflected off adjacent microlenses to differ from each other more reliably, whereby the degree of scintillation produced is more sufficiently reduced.

In the screen described above, the microlenses that form each of the lens rows are preferably formed of at least three types of microlenses whose radii of curvature differ from one another.

The light interference may occur, for example, when the spacing between the lenses is narrow, not only between adjacent lenses but also between two lenses with at least one lens interposed therebetween.

To address the above problem, at least three types of microlenses whose radii of curvature differ from one another are provided, whereby the probability of the radii of curvature being different from one another can be increased even between two lenses with at least one lens interposed therebetween. Therefore, the light rays reflected off the lenses will not interfere with each other, and the degree of scintillation produced is reduced.

Further, providing at least three types of microlenses as described above makes the intensity of the interference fringes (scintillation) weaker, and the interference fringes (scintillation) become less visible to a viewer accordingly.

In each of the lens rows in the screen, the microlenses that form the lens row are preferably arranged regularly in the decreasing order of radii of curvature along the direction in which the lens row extends.

The above configuration allows two lenses with one lens interposed therebetween to have different radii of curvature. Therefore, the light rays reflected off the lenses will not interfere with each other, and the degree of scintillation produced is sufficiently reduced.

In the screen described above, among the microlenses that form each of the lens rows, the difference in the radius of curvature between adjacent two microlenses preferably differs from the difference in the radius of curvature between two microlenses adjacent to the two microlenses.

The above configuration further prevents the light rays reflected off two lenses with one lens interposed therebetween from interfering with each other, and the degree of scintillation produced is reduced.

In the screen described above, the regular arrangement of the microlenses is preferably disposed over the screen substrate in such a way that the arrangements have line symmetry about the center line of the first direction on the screen substrate.

According to the above configuration, when the viewer looks at the center of the screen, the viewer finds an image on the screen line not biased on one side but symmetric in the first direction and hence readily visually recognizes the screen.

In the screen described above, the lens rows are preferably juxtaposed in a second direction that intersects the first direction.

According to the above configuration, the degree of scintillation produced is reduced nearly all over the screen.

In the screen described above, adjacent lens rows among the plurality of lens rows are preferably configured in such a way that the microlenses corresponding to each other in the second direction are irregularly arranged.

According to the above configuration, lenses adjacent in the second direction likely to have different radii of curvature, whereby the degree of scintillation produced when the light rays reflected off the adjacent microlenses interfere with each other is reduced.

In the screen described above, at least part of the microlenses adjacent in each of the lens rows preferably overlap with each other.

The above configuration allows the spacings between the microlenses to be reduced, whereby the brightness is increased to a satisfactory level.

In the screen described above, the first direction may be a substantially horizontal direction with respect to the principal ray, and the lens rows may be arranged along arcs in the substantially horizontal direction.

According to the above configuration, when the projector (projection apparatus) is particularly disposed in front of a central portion of the screen but below the screen, the individual microlenses, which form the lens rows, can be arranged equidistant from the projector. This arrangement can prevent unevenness in brightness from being produced between the central portion and the periphery of the screen.

In the screen described above, each of the microlenses preferably has a light reflecting surface and a light absorbing surface.

The above configuration allows the principal ray from the projector (projection apparatus) to be received selectively by the light reflecting surface and illumination light and other external light to be selectively received by the light absorbing surface. The contrast can therefore be increased.

BRIEF DESCRIPTION OF THE DRAWINGS

The invention will be described with reference to the accompanying drawings, wherein like numbers refer to like elements.

DESCRIPTION OF EXEMPLARY EMBODIMENTS

The invention will be described below in detail with reference to the drawings.

Figure 1A:
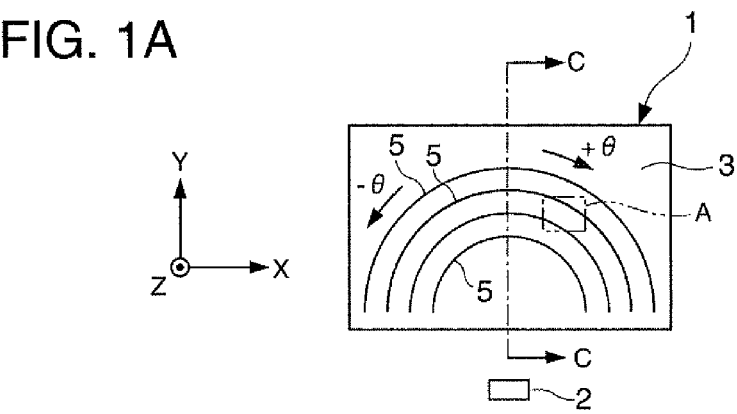
FIGS. 1A to 1C show a screen according to an embodiment of the invention.
Figure 1B:
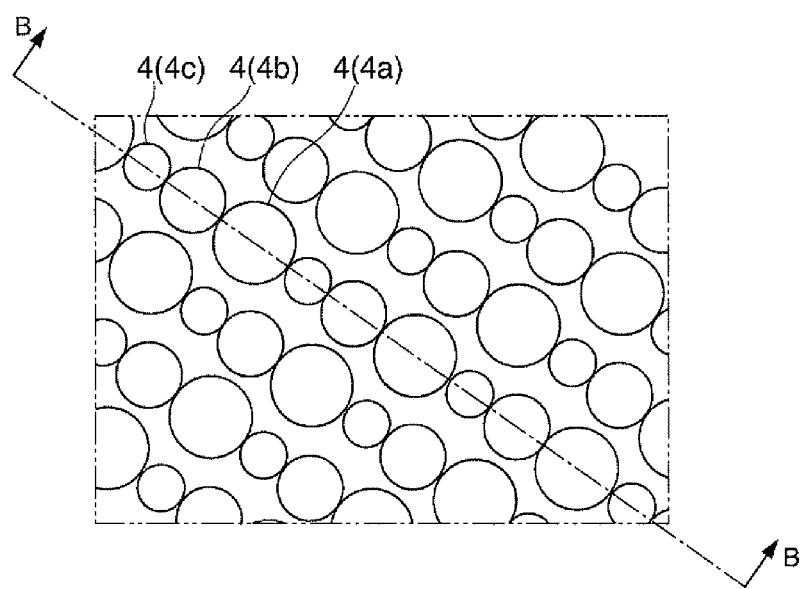
Figure 1C:
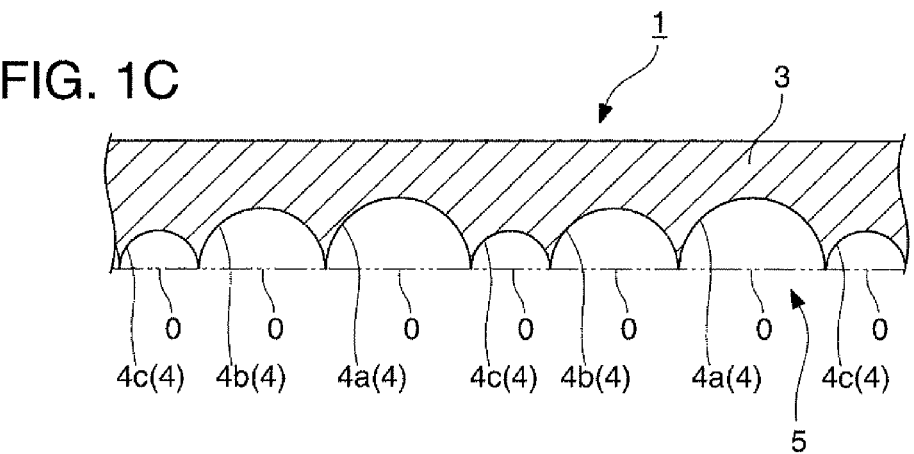

FIGS. 1A to 1C show a screen according to an embodiment of the invention. FIG. 1A is an exterior front view of the screen. FIG. 1B is an enlarged front view showing the portion A in FIG. 1A. FIG. 1C is a cross-sectional view taken along the line B-B in FIG. 1B. In FIGS. 1A to 1C, reference numeral 1 denotes a reflective screen, and the screen 1 has a horizontally elongated shape for reflecting a large portion of projection light PL from a proximity projection-type projector 2 disposed in front of but below the screen 1 toward an area in front of the screen 1. The screen 1 and the projector 2 form an image projection system.

The screen 1 has a plurality of concave microlenses 4, each of which is designed to have a hemispheric surface, disposed on the front side of a screen substrate 3, as shown in FIGS. 1B and 1C. To facilitate the understanding of the microlenses 4, each of the microlenses 4 shown in FIGS. 1B and 1C has a fully hemispheric concave surface; the opening of the microlens 4 is a circle and the side cross section thereof has a hemispheric shape. Each of the microlenses according to the embodiment of the invention, however, does not necessarily have the fully hemispheric surface described above, but may be a surface that is originally designed to have a hemispheric shape. Specifically, in the embodiment of the invention, a microlens that does not apparently have a fully hemispheric surface because it overlaps with an adjacent microlens is considered as a surface that is originally designed to have a hemispheric shape and included in the microlenses according to the embodiment of the invention. In other words, the shape of the microlens is composed of a part on the sphere.

Figure 2:
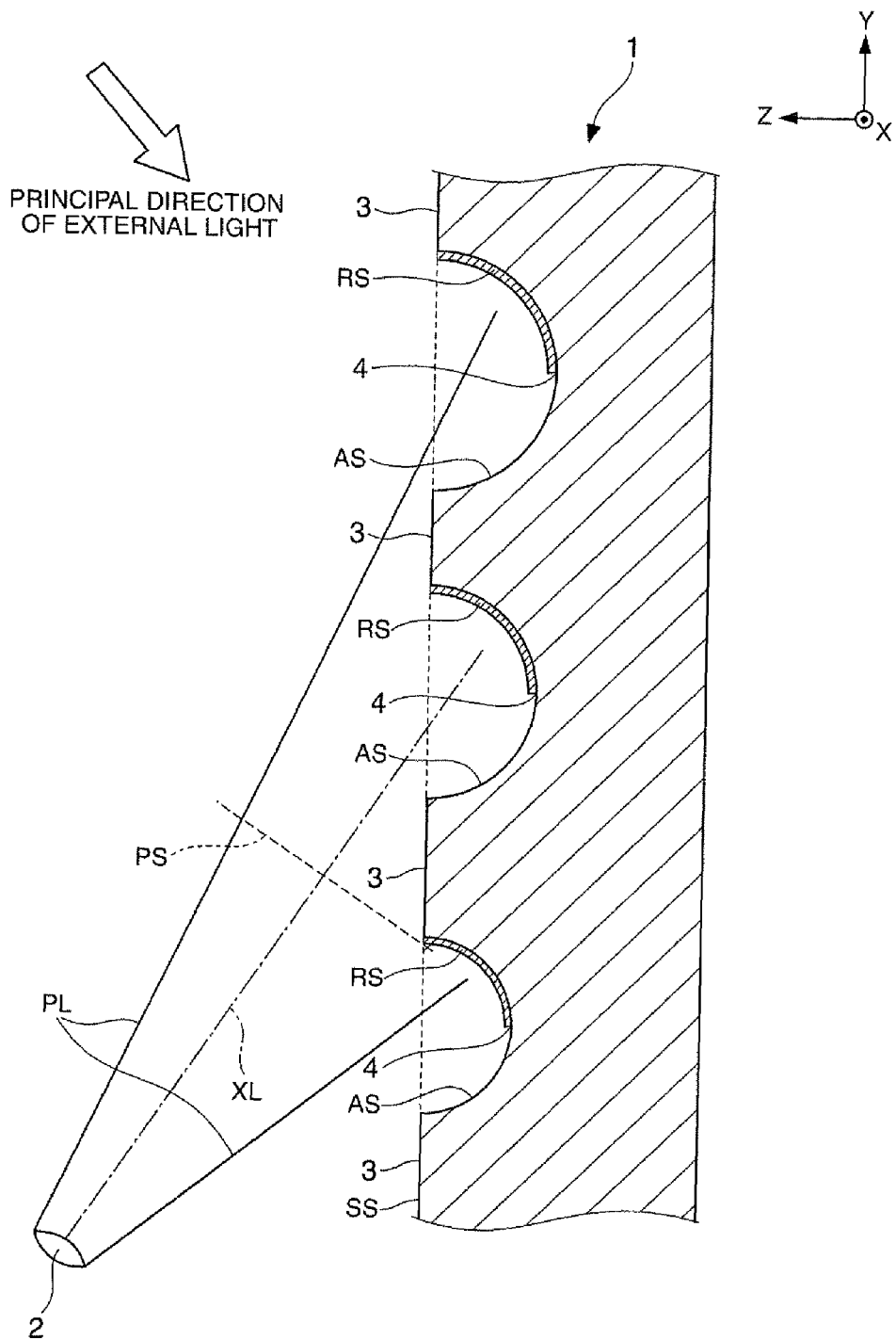
FIG. 2 is a cross-sectional view taken along the line C-C shown in FIG. 1A.

The thus shaped microlens 4 is arranged at a large number of locations along a first direction on the screen substrate 3. The first direction is determined in accordance with the direction of the principal ray from the projector 2 described above. The thus arranged microlenses 4 form lens rows 5, as shown in FIG. 1A. The direction of the line of intersection of two planes, a plane perpendicular to the principal ray of projection light and a screen plane of the screen substrate 3, is called a horizontal direction and defined as the first direction in the invention. The lens rows 5 are therefore formed along the first direction. As an example, the screen 1 along the line C-C in FIG. 1A is shown in FIG. 2, which is a cross-sectional view taken along the line C-C. In a position along the line C-C, the first direction is the direction of the line of intersection of a plane PS, which is perpendicular to the principal ray XL of projection light PL, and a screen plane SS of the screen substrate 3, or the X direction in FIG. 1A. The lens rows 5 are therefore formed along the X direction.

In the present embodiment, however, each of the lens rows 5 is arranged along an arc in the horizontal direction (X direction), that is, extends in a θ direction (+θ direction, −θ direction) corresponding to the horizontal direction, as shown in FIG. 1A. Arranging each of the lens rows 5 along an arc allows the θ direction, in which the lens row 5 extends, to correspond more accurately to the principal ray XL of the projection light, which exits from the projector 2 in radial directions. In this way, the individual microlenses 4, which form the lens rows 5, can be arranged equidistant from the projector 2. This arrangement can prevent unevenness in brightness from being produced between a central portion and the periphery of the screen 1.

To further reduce the unevenness in brightness between the central portion and the periphery of the screen 1, the reference based on which the first direction is determined may alternatively be a plane substantially perpendicular to the principal ray of the projection light, and the angle between the substantially perpendicular plane and the principal ray may vary with the position on the screen substrate.

The microlenses 4 that form each of the lens rows 5 (single lens row 5) are formed in such a way that adjacent microlenses 4 have different radii of curvature, as shown in FIG. 1C. In the present embodiment, the microlenses 4 whose radii of curvature differ from one another are formed of three types of microlenses, a microlens with a large curvature (4a), a microlens with a medium curvature (4b), and a microlens with a small curvature (4c). The three types of microlenses 4a, 4b, and 4c whose radii of curvature differ from one another are regularly arranged in the decreasing order of size along the direction in which each of the lens rows 5 extends (θ direction) in the present embodiment.

Figure 3:
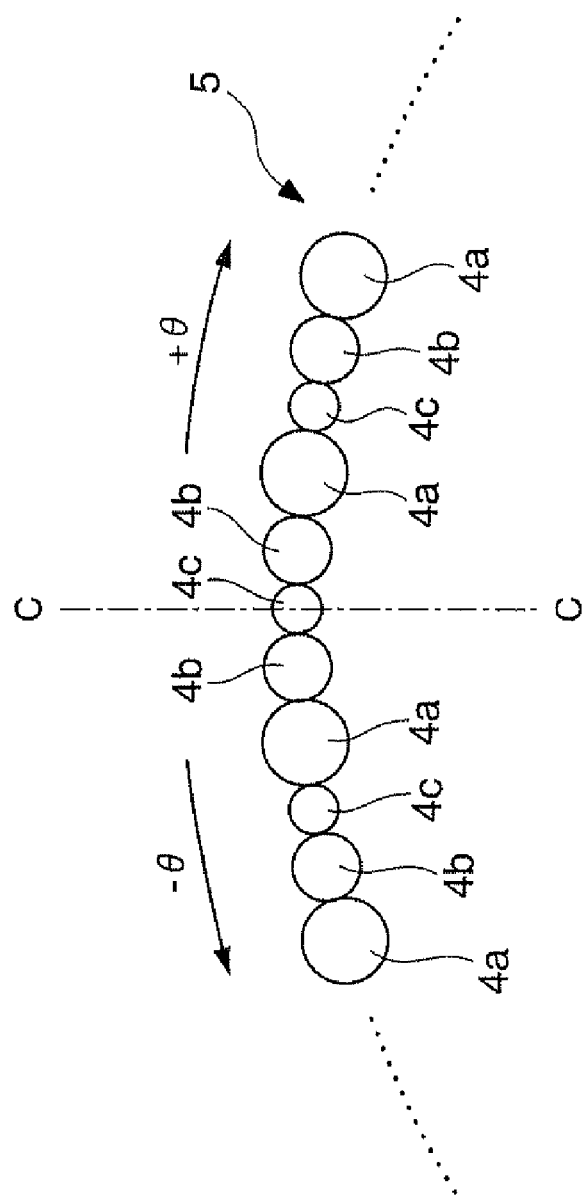
FIG. 3 diagrammatically shows a regular arrangement of microlenses.

In the present embodiment, the regular arrangement described above is disposed over the screen 1 in such a way that the arrangements have line symmetry about the center line of the first direction, that is, the center line of the screen 1, which is indicated by the line C-C shown in FIG. 1A. For example, the microlens 4c, whose radius of curvature is small, is disposed in the position on the line of symmetry (line C-C), and the microlenses 4b and 4a, whose radii of curvature is medium and large, are disposed in this order along the +θ direction, as shown in FIG. 3. The arrangement configured in the order of small (4c), medium (4b), and large (4a) is repeatedly disposed from the center line of the screen 1 along the +θ direction to form each of the lens rows 5, whereby the microlenses 4 are regularly disposed in the order of small, medium, and large. In the −θ direction, the small microlens 4c is disposed in the position on the line of symmetry (line C-C), and the medium microlens 4b and the large microlens 4a are disposed in this order along the −θ direction. The arrangement configured in the order of small (4c), medium (4b), and large (4a) is repeatedly disposed from the center line of the screen 1 along the −θ direction to form the lens row 5, whereby the microlenses 4 are regularly arranged in the order of small, medium, and large.

Therefore, each of the lens rows 5 having the small/medium/large regular arrangement has line symmetry about the center line of the screen 1.

Any regular arrangement, for example, a reversed large/medium/small arrangement, may alternatively be employed. Further, the microlens 4 disposed in the position on the line of symmetry (line C-C) described above may alternatively be the microlens 4b, whose radius of curvature is medium, or the microlens 4a, whose radius of curvature is large.

In the present embodiment, the radii of curvature of the small microlens 4c, the medium microlens 4b, and the large microlens 4a shown in FIG. 1C are 170 μm, 180 μm, and 185 μm, respectively. Therefore, a pair of lenses formed of the small microlens 4c and the medium microlens 4b adjacent in a single lens row 5 has a difference in the radius of curvature of 10 μm. A pair of microlenses adjacent to the pair of microlenses described above, that is, a pair of lenses formed of the medium microlens 4b and the large microlens 4a, has a difference in the radius of curvature of 5 μm. Further, a pair of lenses adjacent to the pair of microlenses described above, that is, a pair of lenses formed of the large microlens 4a and the small microlens 4c, has a difference in the radius of curvature of 15 μm. As described above, in the present embodiment, adjacent pairs of microlenses are configured in such a way that the difference in the radius of curvature between the microlenses in one of the pairs differs from that in the other one of the pairs.

The microlenses 4 (4a, 4b, and 4c), which form each of the lens rows 5, are formed in such a way that the centers O of the radii of curvature are all located in the same plane, as shown in FIGS. 1C and 2. The same plane described above basically coincides with the front surface of the screen substrate 3, that is, the surface of the screen 1 on which the microlenses 4 are formed. However, in the course of the formation of the microlenses 4, the surface of the screen substrate 3 may not coincide with the surface of the resultant screen 1 in some cases. In this case, the plane in which the centers O of the radii of curvature are located is not present on the screen 1 but is present, as a theoretical plane, outside the screen 1.

The spacing between adjacent ones of the microlenses 4, that is, the distance Δx between adjacent ones of the centers O described above, is designed to change regularly with the positions of the microlenses 4 in question on the screen 1. Specifically, the microlenses 4 are designed and formed in such a way that Δx is small in a lower portion of the screen 1 (a portion close to the projector 2), whereas Δx is large in an upper portion. The thus formed microlenses 4 provide a wide angle of view.

Further, in the present embodiment, the lens rows 5, which are formed of the microlenses 4, are juxtaposed at a plurality of locations in a second direction that intersects the first direction, as shown in FIG. 1A. In the present embodiment, the first direction is the horizontal direction (X direction), and the second direction that intersects the first direction is, for example, the direction perpendicular to the first direction, that is, a vertical direction (Y direction). In the present embodiment, since the lens rows 5 extend in the θ direction along the X direction as described above, the plurality of lens rows 5 are formed and disposed in such a way that they extend in the same θ direction. That is, the lens rows 5 are juxtaposed (arranged) along concentric arcs. Since the lens rows 5 extend in the θ direction, the second direction in which the lens rows 5 are juxtaposed is the direction perpendicular to the θ direction, that is, the radial direction of the concentric circles, in the present embodiment.

In the thus juxtaposed plurality of lens rows 5, lens rows 5 and 5 adjacent in the second direction (radial direction) are configured as shown in FIG. 1B in such a way that the microlenses 4 and 4 corresponding to each other in the second direction are irregularly arranged. The difference of size of microlenses 4 and 4 adjacent to each other in the second direction may be irregular. Therefore, the lenses disposed adjacent in the second direction likely have radii of curvature different from each other.

While lens rows 5 and 5 adjacent in the second direction shown in FIG. 1B do not overlap with each other for ease of illustration, the lens rows 5 in the present embodiment actually overlap with each other except part thereof and almost no planar portions are exposed. The spacing between adjacent ones of the lens rows 5 and 5, that is, the distance Δr between adjacent ones of the centers O described above in the second direction (radial direction), is designed to change regularly with the positions of the lens rows 5 in question on the screen 1 in a way similar to Δx described above. Specifically, the lens rows 5 are designed and formed in such a way that Δr is small in a lower portion of the screen 1 (a portion close to the projector 2), whereas Δr is large in an upper portion. The thus formed lens rows 5 provide a wide angle of view.

The spacing Δx between adjacent ones of the microlenses 4 and 4 changes with the positions of the microlenses 4 in question on the screen 1, as described above. In particular, Δx in a lower portion (a portion close to the projector 2) of the screen 1 is small. Therefore, although not illustrated, part of microlenses adjacent in each of the lens rows 5 in a lower portion of the screen 1 overlap with each other. The microlenses 4 and 4 that thus overlap with each other apparently do not have fully hemispheric surfaces but have surfaces that are originally designed to have hemispheric shapes, as described above. In the invention, the center O of the radius of curvature of a microlens 4 having an apparently incomplete hemispheric surface is defined by the center O of the theoretical hemispheric surface.

In each of the microlenses 4, a light reflecting surface RS and a light absorbing surface AS are formed on the concave surface, which works as a lens surface, as shown in FIG. 2. The light absorbing surface AS is, for example, formed by coating a light absorbing material on the surface. In a case where the screen substrate 3 is made of a light transmissive resin, the coating is not particularly required, but the microlens 4, which transmits light, may function as a light absorbing surface that apparently absorbs the light.

The light reflecting surface RS is formed by coating Al (aluminum) or any other suitable material by using evaporation or any other suitable gas-phase method or spraying or any other suitable liquid-phase method. It is noted that the principal ray XL of the projection light PL is oriented upward as described above, whereas the principal direction of external light from an illuminator or any other component is oriented downward, which is substantially symmetrical to the principal ray XL with respect to a normal to the screen plane SS. Therefore, in each of the concave microlenses 4, the light reflecting surface RS is provided in an upper portion of the concave microlens 4, whereas the light absorbing surface AS is provided in a lower portion. The configuration allows the projection light PL oriented upward, which should be projected, to be efficiently reflected and the external light oriented downward from the illuminator or any other component, which is not desirably reflected, to be absorbed by (or transmitted through) the screen 1.

In each of the microlenses 4 described above, since the thickness of the coating made of Al or any other suitable material is much smaller than the radius of curvature, the thickness of the coating does not substantially affect the radius of curvature.

A variety of known methods is used as a method for manufacturing the screen 1. Specifically, a method for forming the concave microlenses 4, in particular, can be a method in which a die having the convex shapes corresponding to the concave shapes of the microlenses 4 is used to press a raw material, such as a resin, or a method in which a UV curing resin is used to transfer the shapes of the microlenses 4.

An example of how to use the screen 1 will next be described with reference to FIG. 4.

Figure 4:
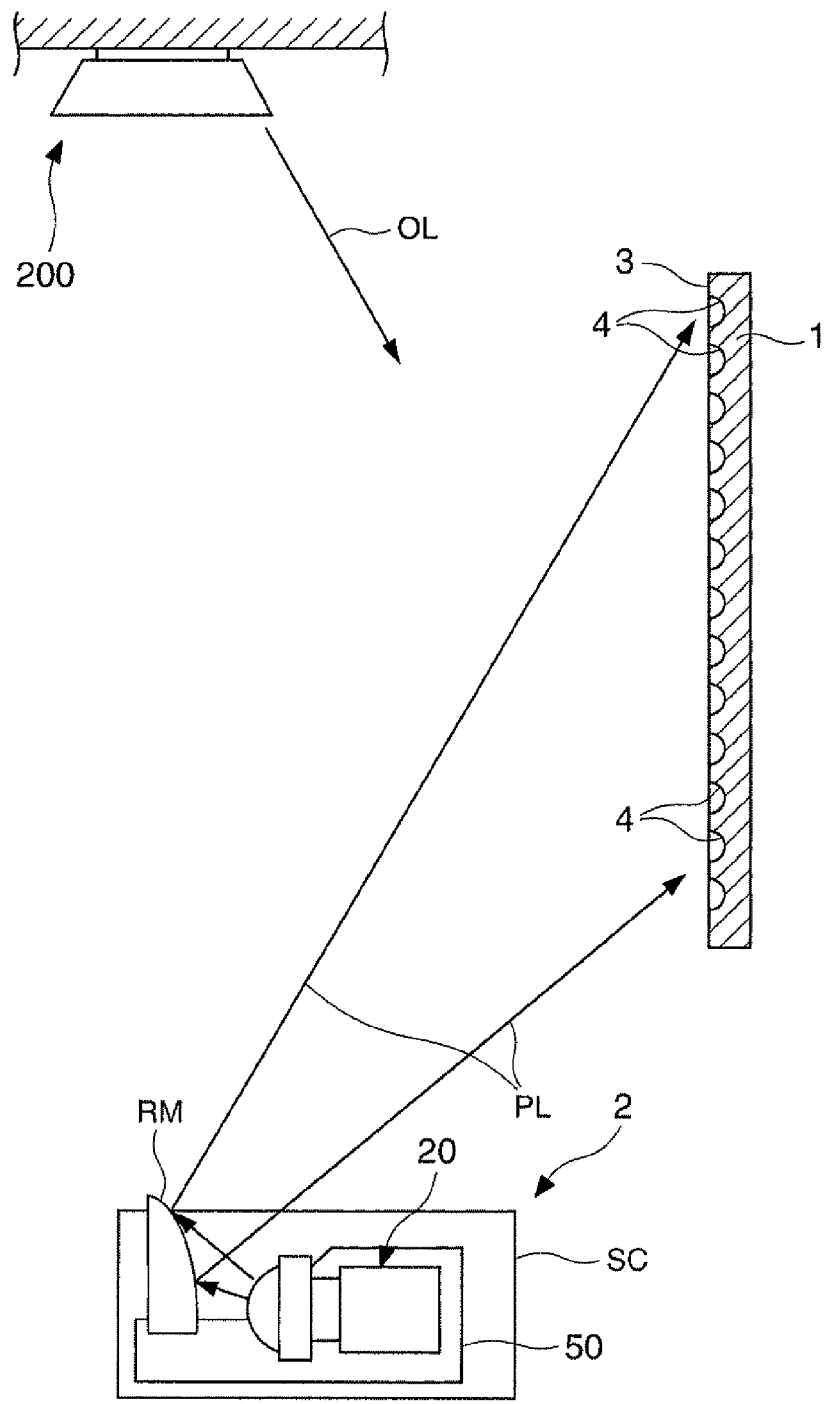
FIG. 4 shows an example of how to use the screen.

As shown in FIG. 4, the proximity projection-type projector 2 is disposed in a central portion in the horizontal direction (first direction) and diagonally down in front of the screen 1, and the screen 1 of the present embodiment is disposed to reflect the projection light PL from the projector 2 toward an area in front of the screen 1. That is, a viewer (not shown) is assumed to be basically in front of the screen 1.

The projector 2 includes a projector body 50, a projection lens 20, and a reflection mirror RM. The mechanisms of the projector 2 are housed in a housing SC. The environment in which the screen 1 and the projector 2 are installed is as follows: An illuminator 200 hung from the ceiling of a room emits light downward as external light OL and the projector 2 carries out upward projection toward the screen 1 as described above.

Image light formed under the control of the projector 2 is outputted through the projection lens 20, reflected off the reflection mirror RM, and outputted as the projection light PL inclined at a desired angle from the projector 2. In this case, the projector 2 carries out oblique projection in which the principal ray XL of the projection light PL is inclined to a normal to the screen 1. The projection light PL projected on the screen 1 is reflected off the microlenses 4, as described above.

Since Δx and Δr change with the position on the screen 1 as described above, a wide angle of view is provided. Further, since the external light OL coming from the above is absorbed by the screen 1, a high-contrast image will be projected even in a room or any other place brightly illuminated by the external light OL.

Moreover, since adjacent microlenses 4 and 4 a single lens row 5 have different radii of curvature in the screen 1 according to the present embodiment of the invention, the degree of scintillation produced can be reduced.

Figure 5A:
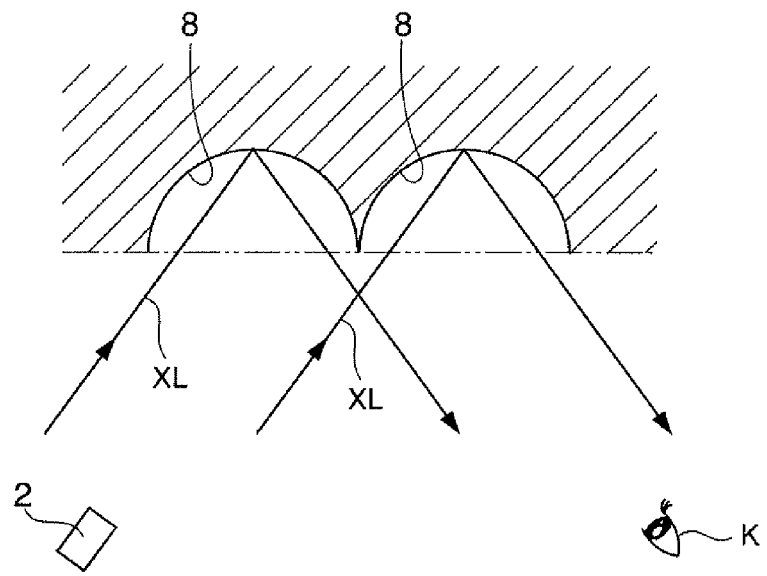
FIGS. 5A and 5B show optical paths of light rays reflected off microlenses.

That is, as shown in FIG. 5A, since adjacent microlenses 8 and 8 in a screen of related art have the same shape and hence the same radius of curvature, projection light rays XL from the projector 2 travel optical paths of the same length and reach a viewer K. As a result, the light rays reflected off the microlenses 8 and 8 are in phase. In this case, the light rays interfere with each other, disadvantageously resulting in scintillation.

Figure 5B:
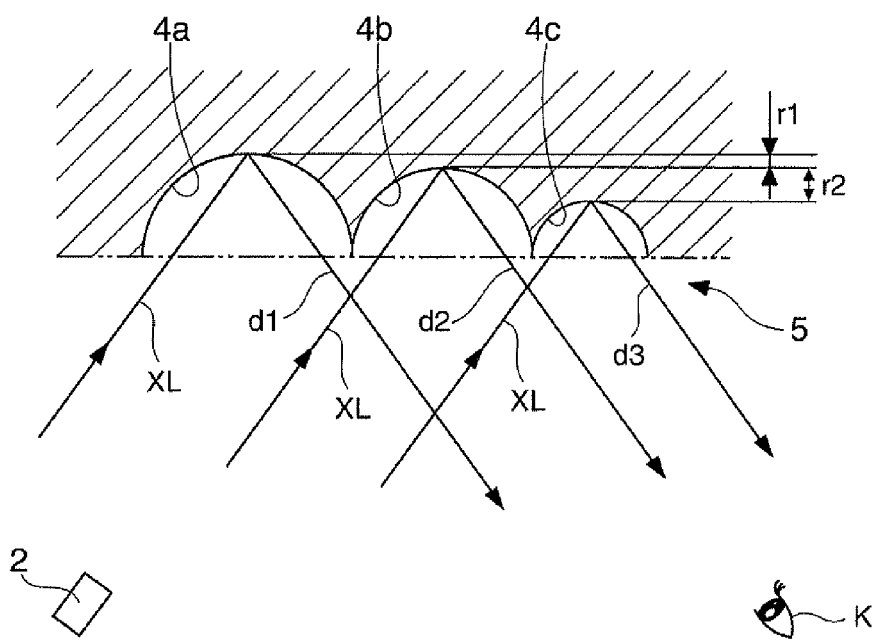

In contrast, in the screen 1 according to the present embodiment of the invention, since adjacent microlenses 4a and 4b (4b and 4c) have different radii of curvature, as shown in FIG. 5B, an optical path difference corresponding to the difference in the radius of curvature r1 (r2) is produced between the microlenses 4a and 4b (4b and 4c). As a result, optical path differences Δd are produced between the optical paths d1, d2, and d3 of the reflected light rays. Therefore, the light rays reflected off the microlenses 4a and 4b are out of phase and less likely interfere with each other. The screen 1 according to the present embodiment of the invention therefore produces less scintillation and provides a higher-quality projected image than those provided in the screen of related art.

Further, in the present embodiment, since the microlenses 4 that form a single lens row 5 have the three types of radii of curvature, large, medium, and small, not only are light rays reflected off adjacent microlenses 4 and 4 out of phase but also light rays reflected off two microlenses 4 and 4 with a microlens interposed therebetween are out of phase, whereby the degree of the interference and hence the scintillation can be reduced. In particular, since the three types of microlenses 4a, 4b, and 4c are regularly disposed in a single lens row 5, the degree of scintillation produced can be sufficiently reduced.

Moreover, since the number of different microlenses 4 is three, the intensity of interference fringes (scintillation) can be reduced, and the interference fringes (scintillation) can be less visible to the viewer accordingly.

Further, as shown in FIG. 5B, since the difference in the radius of curvature r1 between two adjacent microlenses in a single lens row 5 differs from the difference in the radius of curvature r2 between the two microlens adjacent to the microlenses described above, the interference between the light rays reflected off the two microlenses 4a and 4c, between which the microlens 4b is interposed, is sufficiently reduced, and the degree of scintillation produced can be further reduced.

Moreover, since a plurality of lens rows 5 are juxtaposed in the second direction that intersects the first direction, the degree of scintillation produced can be reduced over the screen 1. Further, adjacent lens rows 5 and 5 among the plurality of lens rows 5 are configured in such a way that the microlenses 4 and 4 corresponding to each other in the second direction are irregularly arranged as shown in FIG. 1B. Therefore, the light rays reflected off the adjacent microlenses 4 and 4 will not interfere with each other, whereby the degree of scintillation produced can be reduced.

Further, the microlenses 4 have line symmetry, that is, the microlenses 4 are symmetric about the center line of the first direction, as shown in FIG. 3. Therefore, when the viewer looks at the center of the screen 1, the viewer finds an image on the screen 1 line symmetric in the horizontal direction (right-to-left direction) and hence readily visually recognizes the screen 1.

Since the degree of scintillation produced is reduced, it is possible to reduce the spacings between the microlenses 4 and 4, and the reduction in the spacing increases the brightness to a satisfactory level. Further, the diameter of each of the lenses can be, for example, 0.5 mm or smaller, which prevents the resolution from decreasing and a moire pattern from being produced.

The invention is not limited to the embodiment described above, but a variety of changes can be made thereto to the extent that they do not depart from the spirit of the invention.

For example, while the three types of microlenses whose radii of curvature differ from one another are provided in a single lens row 5 in the present embodiment, the number of types may be two or four or greater.

Figure 6:
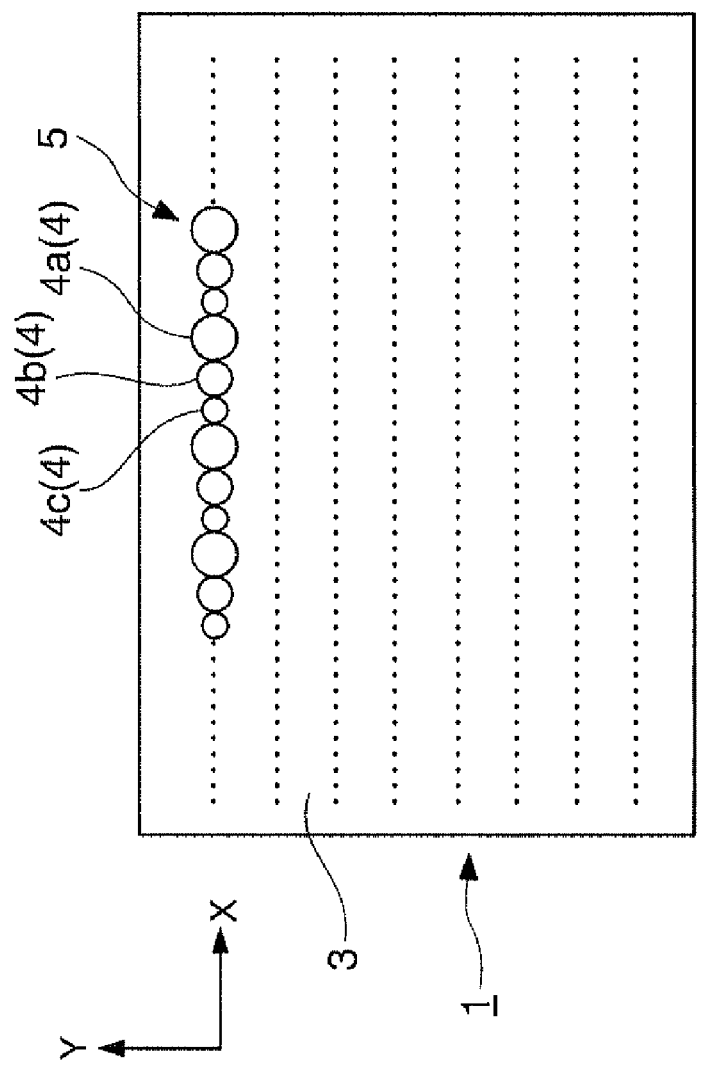
FIG. 6 diagrammatically shows a variation of lens rows.

Further, while the microlenses 4 are arranged along arcs so that the lens rows 5 extend in the θ direction along the horizontal direction (first direction) as shown in FIG. 1A, the lens rows 5 may be formed linearly along the horizontal direction (first direction) as shown in FIG. 6. Moreover, arcuate lens rows and linear lens rows may be concurrently formed.

Figure 7:
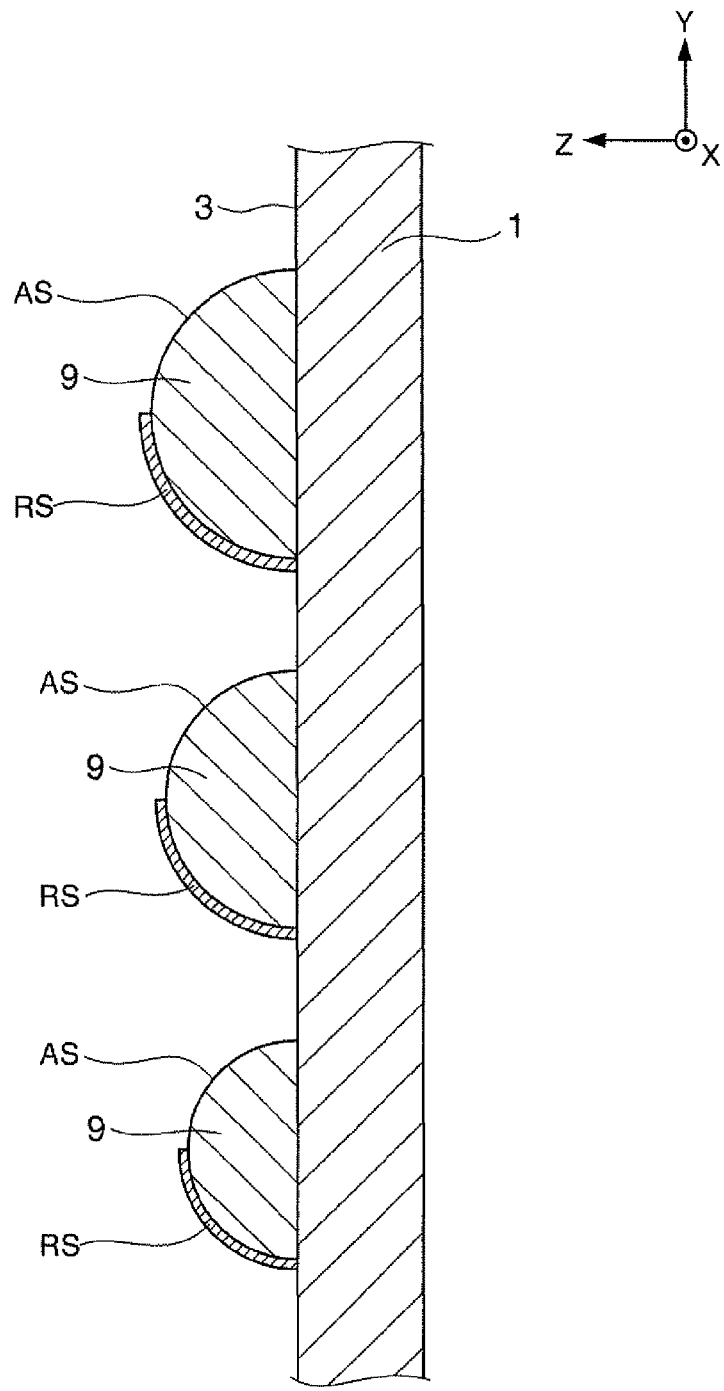
FIG. 7 is a side cross-sectional view showing other exemplary microlenses.

While each of the microlenses according to the present embodiment of the invention has a concave shape, a convex microlens 9 designed to have a hemispheric surface may be employed, as shown in FIG. 7. In this case, however, the light reflecting surface RS is provided in a lower portion of the convex surface, which works a lens surface, and the light absorbing surface AS is provided in an upper portion, as shown in FIG. 7. When each of the microlenses has a convex shape described above, forming adjacent microlenses 9 and 9 in each lens row to have different radii of curvature as in the above embodiment allows the light rays reflected off the adjacent microlenses 9 and 9 to be out of phase, whereby the light rays will not interfere, and hence the degree of scintillation produced can be reduced.

While the above embodiment has been described with reference to the case where a proximity projection-type projector is used as the projector 2, the projector to which the screen according to any of the embodiments of the invention is applied is not limited to a proximity projection-type projector, but a variety of know projectors can be used.

The entire disclosure of Japanese Patent Application No. 2008-327226, filed Dec. 24, 2008 is expressly incorporated by reference herein.

What is claimed is:

1. A screen that reflects light from a projection apparatus to present a projected image, the screen comprising:
   a screen substrate; and
   a plurality of microlenses disposed on the front side of the screen substrate,
   wherein the microlenses are arranged along a predetermined first direction on the screen substrate to form lens rows, and
   adjacent microlenses in each of the lens rows have different radii of curvature,
   wherein in each of the lens rows, the microlenses that form the lens row are regularly arranged in the decreasing order of radii of curvature along the direction in which the lens row extends.

2. The screen according to claim 1,
   wherein each of the microlenses disposed on the front side of the screen substrate has a concave shape.

3. The screen according to claim 1,
   wherein each of the microlenses disposed on the front side of the screen substrate has a convex shape.

4. The screen according to claim 1,
   wherein each of the microlenses is designed to have a hemispheric shape.

5. The screen according to claim 1,
   wherein the centers of the radii of curvature of the microlenses that form each of the lens rows are located in a single plane.

6. The screen according to claim 1,
   wherein the microlenses that form each of the lens rows are formed of at least three types of microlenses whose radii of curvature differ from one another.

7. The screen according to claim 1,
   wherein among the microlenses that form each of the lens rows, the difference in the radius of curvature between adjacent two microlenses differs from the difference in the radius of curvature between two microlenses adjacent to the two microlenses.

8. The screen according to claim 7,
   wherein the regular arrangement of the microlenses is disposed over the screen substrate in such a way that the arrangements have line symmetry about the center line of the first direction on the screen substrate.

9. The screen according to claim 1,
   wherein the regular arrangement of the microlenses is disposed over the screen substrate in such a way that the arrangements have line symmetry about the center line of the first direction on the screen substrate.

10. The screen according to claim 1,
    wherein the lens rows are juxtaposed in a second direction that intersects the first direction.

11. The screen according to claim 10,
wherein adjacent lens rows among the plurality of lens rows are configured in such a way that the microlenses corresponding to each other in the second direction are irregularly arranged.

12. The screen according to claim 1,
wherein at least part of the microlenses adjacent in each of the lens rows overlap with each other.

13. The screen according to claim 1,
wherein the first direction is determined by the direction of the principal ray of a light flux incident from the projection apparatus and a screen surface of the screen substrate.

14. The screen according to claim 13,
wherein the first direction is a substantially horizontal direction with respect to the principal ray, and the lens rows are arranged along arcs in the substantially horizontal direction.

15. The screen according to claim 1,
wherein each of the microlenses has a light reflecting surface and a light absorbing surface.

16. An image projection system comprising:
the screen according to claim 1; and
a projection apparatus that projects an image on the screen.

* * * * *